United States Patent [19]
Strang

[11] 3,820,861
[45] June 28, 1974

[54] SELF-ALIGNING BEARING MEMBER
[75] Inventor: Samuel J. Strang, Mishawaka, Ind.
[73] Assignee: The Injection Plastic Co., Inc., Tippecanoe, Ind.
[22] Filed: May 25, 1973
[21] Appl. No.: 363,874

[52] U.S. Cl.................................. 308/72, 29/148.4
[51] Int. Cl. ......................... F16c 9/06, B21d 53/10
[58] Field of Search ................ 308/29, 72; 29/148.4

[56] References Cited
UNITED STATES PATENTS
2,952,900  9/1960  Glovan................................ 308/72

Primary Examiner—Charles J. Myhre
Assistant Examiner—Frank Susko
Attorney, Agent, or Firm—Oltsch & Knoblock

[57] ABSTRACT

A bearing member having self-aligning features and which is of a multiple part construction including a housing and a bearing unit. The bearing member housing has an elliptical opening formed therein which receives in removable interlocking cooperation the universally tiltable bearing unit which has an outer edge also of an elliptical configuration.

3 Claims, 11 Drawing Figures

SELF-ALIGNING BEARING MEMBER

SUMMARY OF THE INVENTION

This invention relates to a bearing having self-aligning characteristics.

The bearing of this invention includes an outer housing and a removable tiltable inner bearing unit which is adapted to support a shaft. The outer housing has an elliptical opening formed therein and receives the bearing unit which is complementally elliptically shaped. The inner surface of the housing opening and the outer surface of the bearing unit are part-spherical and cooperate to impart the tiltable, self-aligning characteristic of the bearing and to permit the connection and separation of the bearing unit from the housing by selected manipulation of the bearing unit.

The bearing of this invention can be economically constructed from non-metallic, non-corrosive materials which enable the bearing to be utilized in industrial applications where cleanliness is of predominant importance. By utilizing elliptical cooperating parts, the bearing of this invention can be assembled without the utilization of set-screws or similar retainers which are normally used to prevent the insert member or bearing unit of the bearing from rotating within the housing or carrier.

It is an object of this invention to provide an economical self-aligning bearing.

It is another object of this invention to provide a non-metallic, non-corrosive, self-aligning bearing.

Another object of this invention is to provide a bearing member having an outer housing and a removable, tiltable inner bearing unit, each having cooperatively engaging part-spherical, elliptical parts.

Other objects of this invention will become apparent upon a reading of the invention's description.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

The embodiment of the bearing member shown in FIGS. 1-10 includes a housing 10 and a bearing unit 12. Housing 10 and bearing unit 12 may be formed of a plastic material, such as a thermoplastic polycarbonate resin, having structural characteristics of toughness, impact strength, heat resistance and dimensional stability with some degree of flexiblity to allow for the hereinafter described snap-fit of the bearing unit within the housing. One such thermoplastic polycarbonate resin is manufactured by General Elelctric and sold under the tradename "Lexan".

Figure 4:
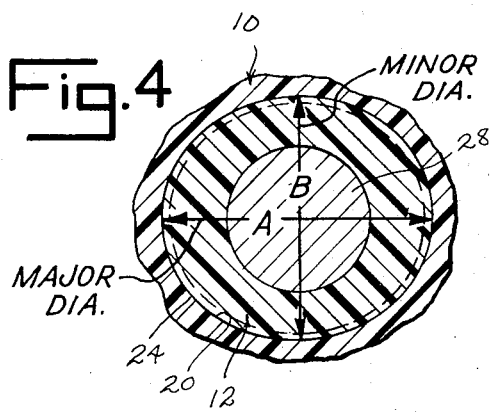
FIG. 4 is a fragmentary sectional view taken along line 4—4 of FIG. 2.
Figure 5:
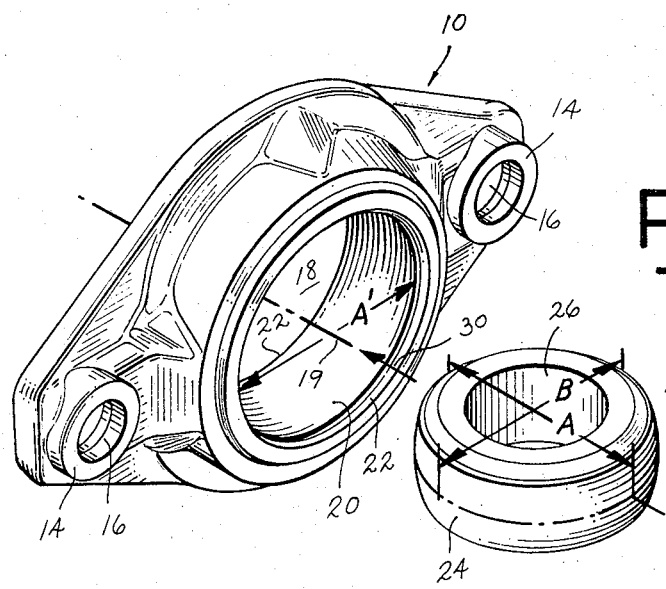
FIG. 5 is an exploded perspective view of the bearing member of FIG. 1 showing the housing and bearing unit thereof in separated form in preparation for inserting the bearing unit into the housing.
Figure 6:
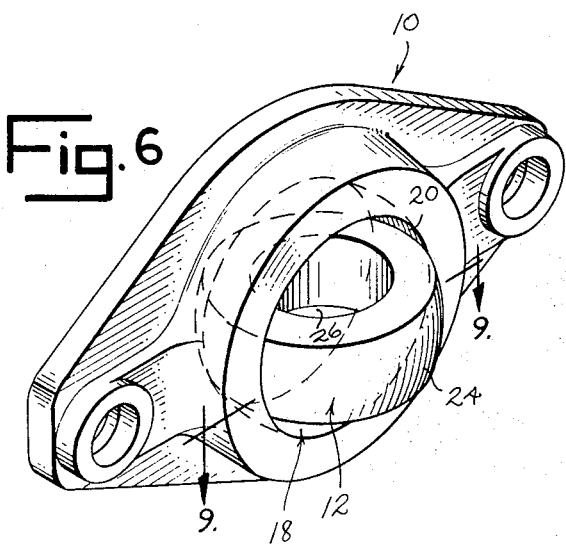
FIG. 6 is a perspective view of the bearing unit of FIG. 5 after having been inserted into the housing of the bearing member.
Figure 7:
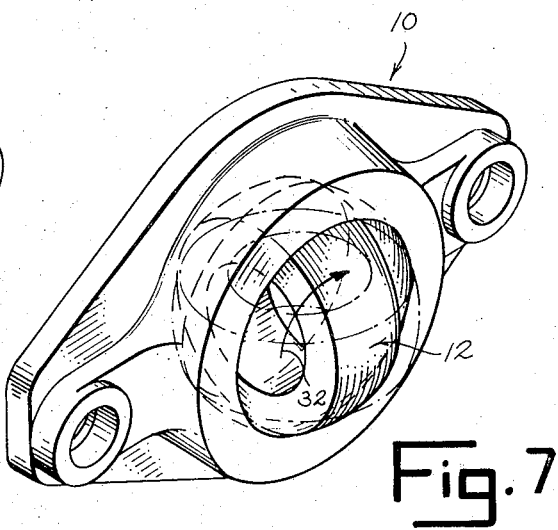
FIG. 7 is a perspective view of the bearing unit having been sequentially rotated within the housing from the position illustrated in FIG. 6.
Figure 8:
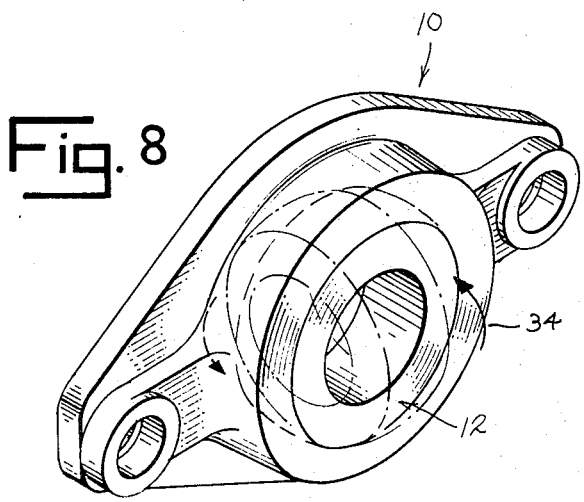
FIG. 8 is a perspective view of the bearing unit having been sequentially rotated within the housing from the position illustrated in FIG. 7.
Figure 10:
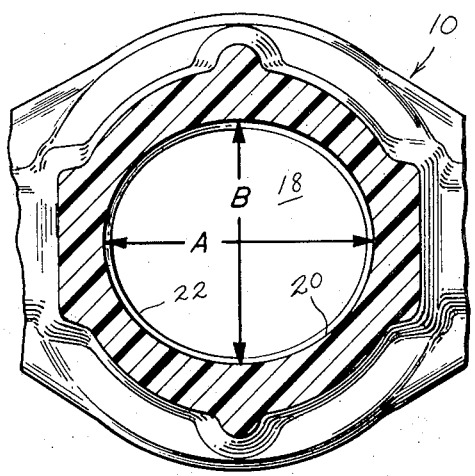
FIG. 10 is a fragmentary sectional view taken along line 10—10 of FIG. 3 shown with the shaft and bearing unit removed from the housing.

Housing 10 can be provided with a plurality of bosses 14 through which apertures 16 are formed therein for the purpose of securing the housing to a supporting machine structure. An elliptical opening 18 is formed in housing 10. Opening 18 is defined by a maximum major diameter A and a maximum minor diameter B as seen in FIG. 10. The inner face or surface 20 of opening 18 is concave and part-spherical in cross section. The outer lips 22 of opening 18 are defined in part by a minimum major diameter A' as seen in FIG. 5. Bearing unit 12 has an outer edge 24 which is elliptical in circumference and which is convex and part-spherical in cross section. Outer edge 24 of the bearing unit is defined by a maximum major diameter A and a maximum minor diameter B as seen in FIG. 4. The bearing unit may be provided with a central opening 26 or other bearing means which is utilized to journal or support a shaft 28. Shaft 28 will rotate relative to bearing unit 12 and housing 10.

Figure 1:
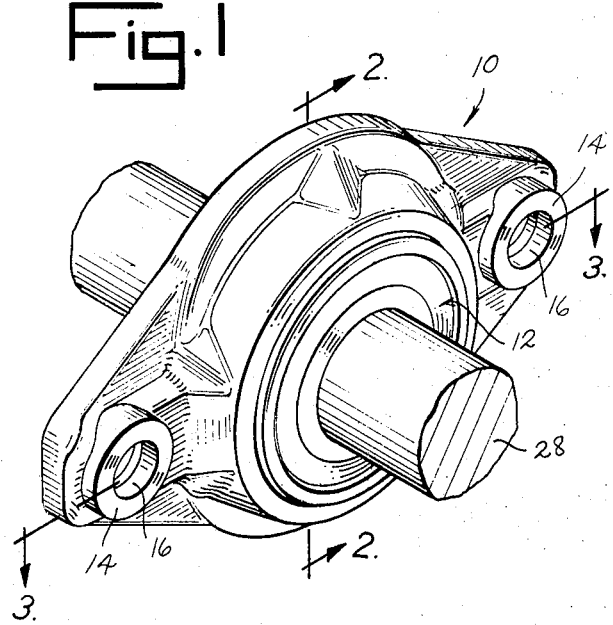
FIG. 1 is a perspective view of one embodiment of the bearing member of this invention shown supporting a shaft extending transversely through the bearing member.

The maximum major diameter A of bearing unit 12 is preferably slightly less, in the order of 0.002 to 0.004 inches, than the maximum major diameter A of the housing opening 18 and is greater than the maximum minor diameter B of the housing opening. The maximum minor diameter B of housing opening 18 is preferably slightly larger, in the order of 0.002 to 0.004 inches, than the maximum minor diameter B of bearing unit 12. For bearing members having a bearing unit 12 of a 1¾ or less maximum major diameter, the difference between the maximum major diameter A and maximum minor diameter B of each of housing opening 18 and the bearing unit will be approximately 3/32 inches. The part-spherical surface 20 of housing opening 18 and the part-spherical outer edge 24 of bearing unit 12 are complementally formed by radii originating from a concentric geometrical center when the bearing unit is fitted within housing 10 as shown in FIGS. 1-3.

The assembly and operation of the bearing member will now be described. To insert bearing unit 12 into housing opening 18, the bearing unit is first turned and inserted edge-wise into the opening in a plane substantially paralleling the axis 19 of the opening with the maximum major diameter A of the unit coinciding with the opening axis. The bearing unit is inserted as indicated by arrows 30 in FIGS. 5 and 9 through the first outer lip 22 of the housing opening and into the opening until maximum minor diameter B of the unit coincides with the maximum major diameter A of the housing opening as shown in solid lines in FIG. 6 and 9. Bearing unit 12 is then rotated 90° about its maximum major diameter A within opening 18 in housing 10 as indicated by arrow 32 in FIG. 7 until maximum minor diameter B of the unit coincides with the maximum minor diameter B of the housing opening. With the bearing unit in the solid line position shown in FIG. 7, the unit is rotated 90° about its maximum minor diameter B relative to housing 10 within opening 18 as indicated by arrow 34 in FIG. 8, thus causing the unit to be fitted complementally within the housing opening with the maximum major diameter A of the unit coinciding with the maximum major diameter A of the housing as illustrated in FIGS. 1-3 and 8.

Figure 2:
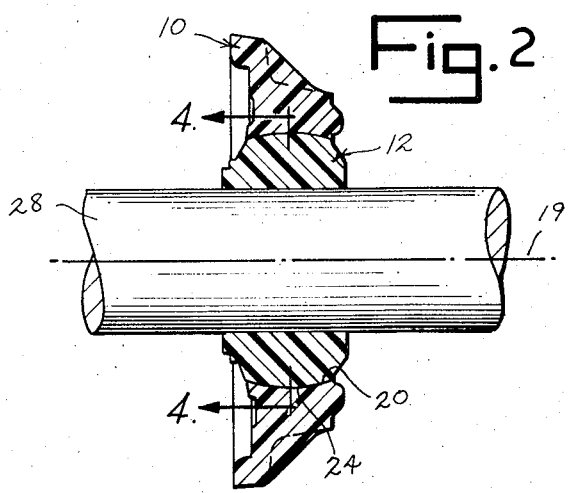
FIG. 2 is a sectional view taken along line 2—2 of FIG. 1.
Figure 3:
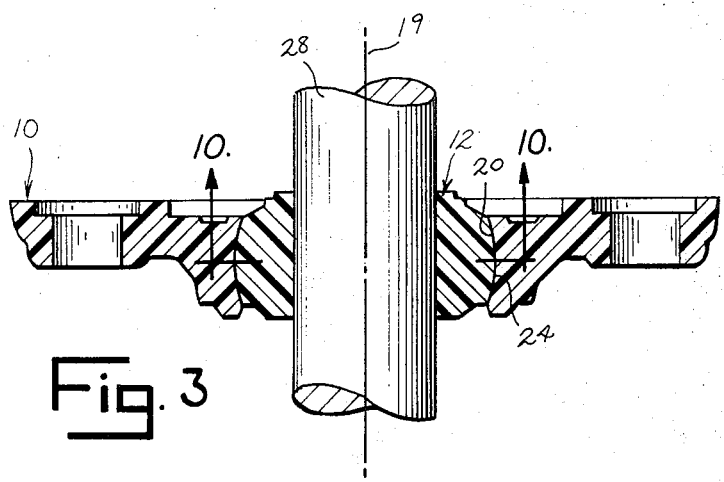
FIG. 3 is a sectional view taken along line 3—3 of FIG. 1.

As best illustrated in FIGS. 2 and 3, bearing unit 12 fits complementally within opening 18 in housing 10 with the part-spherical outer edge 24 of the unit making slight frictional contact with part-spherical surface 20 of the opening. The frictional contact between outer edge 24 of bearing unit 12 and surface 20 of housing opening 18 is not sufficient to substantially retard universal tiliting movement of shaft 28 and the bearing unit relative to housing 10. While part-spherical outer edge 24 and surface 20 of the bearing unit and housing opening allow universal tiltable movement of the bearing unit relative to the housing, the complemental curvature of the edge and surface prevents the bearing unit from being dislodged from opening 18 through either a pull or push along the longitudinal dimension of shaft 28. The only way in which bearing unit 12 can be separated from housing 10 without destruction of either the bearing unit or housing is to reverse the procedure above described for inserting the bearing unit into the housing opening.

Figure 9:
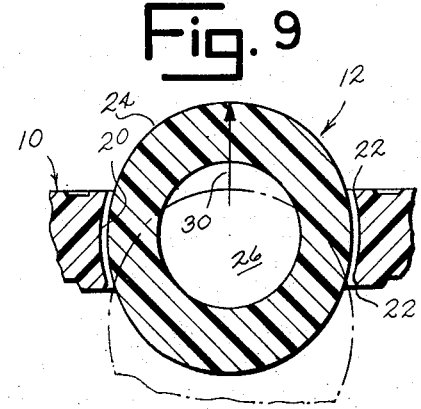
FIG. 9 is a fragmentary sectional view taken along line 9—9 of FIG. 6.

Minimum major diameter A' as measured across outer lips 22 of housing opening 18 and shown in FIG. 5 is preferably slightly less than maximum minor diameter B of bearing unit 12 so as to cause the bearing unit when initially inserted edge-wise into the housing opening as illustrated in FIGS. 5 and 9 to be snap-fitted into the opening where maximum major diameter A of the opening coincides with maximum minor diameter B of the unit. Either bearing unit 12 or housing 10 is constructed from a material which has sufficient resiliency to permit the snap-fit or forced passage of the bearing unit through one of the outer lips 22 of the housing without the destruction of either the housing or unit.

Figure 11:
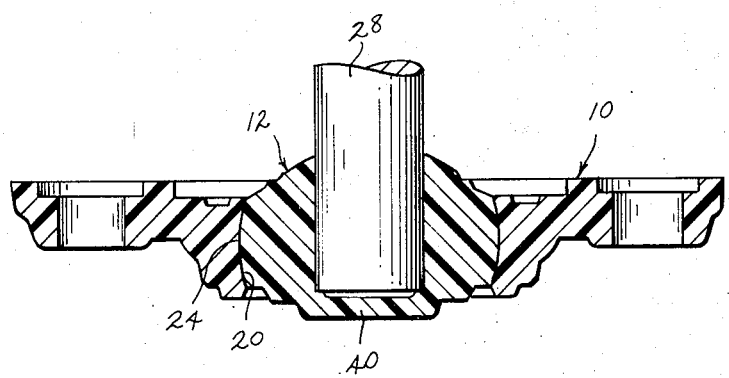
FIG. 11 is a sectional view showing the bearing member of this invention in modified form to accommodate thrust loads.

The bearing member illustrated in FIG. 11 is constructed similarly to and assembled in the same manner as that previously described for the bearing unit shown in FIGS. 1-10 with the exception that bearing unit 12 is formed with a transverse end wall 40. End wall 40 permits the bearing member to accommodate one end of the shaft 28 and to be utilized as a closed end bearing to accommodate thrust loads. Again, the curvature of outer edge 24 of the bearing unit and surface 20 of the housing opening 18 prevents the assembled and fitted bearing unit from being pushed out of the housing 10.

It is to be understood that the invention is not to be limited to the details above given, but may be modified within the scope of the appended claims.

What I claim is:

1. A self-aligning bearing member comprising an outer housing and a removable tiltable inner bearing unit, said outer housing having an elliptical opening therein, said housing opening having a maximum major diameter and a maximum minor diameter, said bearing unit including centrally disposed means for rotatably supporting a shaft, said bearing unit having a maximum major diameter and a maximum minor diameter defining an outer edge of elliptical configuration, said bearing unit outer edge having a part-spherical convex cross sectional configuration, said housing opening having an inner surface of part-spherical concave cross sectional configuration, said bearing unit being seated in said housing opening with the maximum major diameters of said unit and opening being coincident and with the maximum minor diameters of said unit and opening being coincident and having the outer edge of the unit and the inner surface of the opening in complemental sliding cooperation permitting universal tiltable movement of the unit within said housing opening, the maximum major diameter of said housing opening exceeding the maximum minor diameter of said bearing unit and the maximum minor diameter of said housing opening being no smaller than the maximum minor diameter of said bearing unit to permit said unit to be initially inserted into said housing opening edgewise in a plane substantially parallel to the axis of said opening with the maximum major diameter of said unit generally coinciding with said opening axis and thereafter rotated 90° within said opening about the maximum major diameter of said unit until said maximum minor diameters of said unit and opening coincide, the maximum major diameter of said housing opening being not less than the maximum major diameter of said bearing unit to permit said unit to be rotated 90° about its maximum minor diameter with the maximum minor diameters of said unit and opening coinciding.

2. The bearing member of claim 1 wherein at least one of said bearing unit and housing is formed of a resilient material, said housing opening having a minimum major diameter at the outer lip of said opening inner surface, said maximum and minimum major diameters of said housing opening intersecting the axis of said opening and paralleling one another, said maximum minor diameter of said bearing unit exceeding said minimum major diameter to cause the elastic deformation of said one unit or housing and the snap-fit of said unit into said housing opening as said unit is so inserted edgewise in a plane substantially paralleling the axis of said opening.

3. The method of assembling a self-aligning bearing wherein said bearing includes an outer housing and a removable tiltable inner bearing unit, said outer housing having an elliptical opening therein, said housing opening having an axis and having a maximum major diameter and a maximum minor diameter, said bearing unit including centrally disposed means for rotatably supporting a shaft, said bearing unit having a maximum major diameter and a maximum minor diameter defining an outer edge of an elliptical configuration, said bearing unit outer edge being of a part-spherical convex cross sectional configuration, said housing opening having an inner surface of a part-spherical concave cross sectional configuration, the maximum major diameter of said housing opening exceeding the maximum minor diameter of said bearing unit and the maximum minor diameter of said housing opening being no smaller than the maximum minor diameter of said bearing unit, comprising the steps:

a. inserting said bearing unit edgewise into said housing opening in a plane substantially paralleling the axis of said opening until the maximum minor diameter of said unit coincides with the maximum major diameter of said housing opening, thereafter b. rotating said bearing unit 90° about the maximum major diameter of said unit within said opening to cause the maximum minor diameter of said unit to coincide with the maximum minor diameter of said opening, and thereafter c. rotating said bearing unit 90° about the maximum minor diameter of said unit within said opening to fixedly seat said unit in said opening.

* * * * *